United States Patent
Horstmann

Patent Number: 5,947,343
Date of Patent: Sep. 7, 1999

[54] FLASK FOR LIQUIDS HAVING SPRING-ACTUATED CLOSURE ELEMENT

[75] Inventor: Klaus Horstmann, Neuenkirchen, Germany

[73] Assignee: Emsa-Werke Wulf GmbH & Co., Emsdetten, Germany

[21] Appl. No.: 08/894,837

[22] PCT Filed: Mar. 14, 1996

[86] PCT No.: PCT/EP96/01111

§ 371 Date: Jan. 13, 1998

§ 102(e) Date: Jan. 13, 1998

[87] PCT Pub. No.: WO96/28076

PCT Pub. Date: Sep. 19, 1996

[30] Foreign Application Priority Data

Mar. 14, 1995 [DE] Germany ................ 295 04 343 U

[51] Int. Cl.⁶ .................................................. B67D 5/06
[52] U.S. Cl. ................. 222/474; 222/472; 222/511; 222/517
[58] Field of Search .................. 222/470, 472, 222/474, 511, 517, 556

[56] References Cited

U.S. PATENT DOCUMENTS

| | | | |
|---|---|---|---|
| 2,143,250 | 1/1939 | Ritter | 221/15 |
| 2,543,850 | 3/1951 | Henricson | 222/518 |
| 3,400,866 | 9/1968 | Fattori | 222/511 |
| 3,443,728 | 5/1969 | Scholle | 222/511 |
| 3,561,632 | 2/1971 | Shirae | 215/74 |
| 5,265,767 | 11/1993 | Gustafson | 222/144.5 |
| 5,273,194 | 12/1993 | McNamara | 222/470 |
| 5,350,090 | 9/1994 | McClure | 222/511 |

FOREIGN PATENT DOCUMENTS

| | | | |
|---|---|---|---|
| 0 169 366 | 1/1986 | European Pat. Off. . | |
| 0291788 | 11/1988 | European Pat. Off. | 222/511 |
| 0571140 A1 | 5/1993 | European Pat. Off. . | |
| 1 124 207 | 9/1962 | Germany . | |
| 2 152 725 | 4/1973 | Germany . | |
| 21 52 725 C3 | 10/1981 | Germany . | |
| 29 35 260 C2 | 7/1982 | Germany . | |
| 83 14 500 | 10/1983 | Germany . | |
| 84 08 834 U1 | of 1984 | Germany . | |
| 21 62 843 C2 | 4/1984 | Germany . | |
| 83 33 674 | 4/1984 | Germany . | |
| 31 04 070 C2 | 6/1984 | Germany . | |
| 84 10 125 | 1/1985 | Germany . | |
| 34 12 208 A1 | 10/1985 | Germany . | |
| 34 27 429 C1 | 12/1985 | Germany . | |
| 33 42 356 C2 | 4/1986 | Germany . | |
| 3510339 A1 | 4/1986 | Germany . | |
| 33 47 713 C2 | 8/1986 | Germany . | |
| 34 14 429 C2 | 12/1986 | Germany . | |
| 33 48 047 C2 | 6/1987 | Germany . | |
| 88 13 591 | 2/1988 | Germany . | |
| 91 06 332 U1 | 9/1991 | Germany . | |
| 37 17 730 C2 | 2/1992 | Germany . | |
| 33 12 915 C2 | 3/1992 | Germany . | |
| 92 08 686 | 12/1992 | Germany . | |
| 29512021 U1 | 11/1995 | Germany . | |
| 1141907 | 2/1969 | United Kingdom . | |
| 1339005 | 11/1973 | United Kingdom . | |

*Primary Examiner*—Joseph A. Kaufman
*Attorney, Agent, or Firm*—Burns, Doane, Swecker & Mathis, L.L.P.

[57] ABSTRACT

In a flask for liquids, in particular an insulating flask, a pouring aperture can be closed by a lid which can be releasably attached to the flask. The lid is provided with a closure element which can be moved by a handle and is loaded by a spring element towards a closed position. The closure element is movable in a substantially vertical opening motion between an open position, in which the pouring aperture is released, and the closed position, in which the pouring aperture is closed. In order to ensure that the closure element is movable by an uncomplicated, durable mechanism, with the pouring aperture being easily openable and effectively closable during operation, the spring element is formed from a spring-elastic diaphragm connecting the closure element to the lid.

26 Claims, 8 Drawing Sheets

FLASK FOR LIQUIDS HAVING SPRING-ACTUATED CLOSURE ELEMENT

TECHNICAL FIELD

The present invention relates to a flask for liquids, in particular an insulating flask, in which a pouring aperture can be closed by means of a lid which can be releasably attached to the flask, and the lid comprises a closure element which can be moved by means of a handle and which is loaded by a spring element towards a closed position and is movable in a substantially vertical opening movement between an open position, in which the pouring aperture is released, and the closed position, in which the pouring aperture is closed.

BACKGROUND OF THE INVENTION

In a flask of the above-mentioned type, which is known from G 83 33 674, the closure element is formed by a valve plate which is connected to a guide ring via a a snap type connection. The guide ring is substantially vertically movably supported in a bottom part of the lid. A shaft which is in motional communication with a handle projects from the guide ring. A spring element which loads the guide ring and thus valve plate towards the closed position is supported between an abutment and a bottom of the guide ring.

A plurality of sealing rings are provided for sealing the pouring aperture through the valve plate and for sealing the guide ring in the lid.

DE 34 27 42 9 discloses a further flask of the above-mentioned type. In this flask, the handle is formed as an upper lid member which is rotatable about a vertical axis. This member is rotatably supported on a lower lid member provided with an external thread. A closure slide which has a shaft arranged on its upper side is provided as a closure element for the pouring aperture. The shaft has an external thread which is in engagement with a corresponding internal thread of the handle for adjusting the closure slide between closed position and open position. A pressure spring which loads the closure slide towards the closed position is supported between handle and shaft.

To seal the pouring aperture and the shaft relative to the bottom lid member, a plurality of seals are provided in the closure slide and between closure slide, shaft and lower lid member.

A further flask of the above-described type is known from DE 37 17 730. This flask comprises a stopper as a closure element which is supported by a lever mechanism to be pivotable in upward direction towards the lid. As a consequence, the opening movement of the stopper is not strictly vertical, but takes place along the arc of a circle with a bearing of the lever mechanism as the center of the circle.

All of the prior-art flasks have the drawback that the mechanism for opening and closing the closure element is complicated and prone to failure due to the arrangement and support of the spring. Furthermore, a plurality of seals are required for sealing, for instance, the interior of the lid which receives the spring and for sealing the adjusting members connected to the closure element proper against penetrating liquid.

SUMMARY OF THE INVENTION

It is therefore the object of the present invention to improve a flask of the above-mentioned type such that the closure element is movable by means of an uncomplicated and durable mechanism, with the pouring aperture being easily openable and effectively closable during operation.

According to the present invention this object is achieved in that the spring element is formed from a spring-elastic diaphragm connecting the closure element to the lid.

A separate spring is no longer needed, so that difficulties will also not arise from the arrangement and liquidproof sealing of the spring. The diaphragm follows the movement of the closure element between open and closed positions. It effects guidance and relative support of the closure element with respect to the lid. Moreover, the diaphragm is used for producing spring forces by corresponding deflection. The diaphragm transfers the restoring forces to the closure element, so that in its closed position the closure element is pressed onto the pouring aperture under a load. During opening the spring action exerted by the diaphragm is counteracted by the handle, so that upon release of the handle the closure element is automatically pressed back into the closed position via the diaphragm. Furthermore, an advantageous one-hand operation of the flask according to the invention is possible by the action of the diaphragm.

The diaphragm preferably extends at least in part in a direction transverse to the opening movement of the closure element. This part of the diaphragm can be displaced in a direction transverse to its direction of extension during opening, with the deformability of said planar part being optimally exploited.

The diaphragm may be formed at least in part as a planar circular ring in an especially advantageous manner. The ring can be deflected in a direction perpendicular to its planar extension, thereby simultaneously effecting a dimensionally stable mounting or guidance of the closure element on the lid in the direction of its plane. Inner and outer circumference of the circular ring can, for instance, be connected to the lid and the closure element, respectively.

In a further embodiment, the diaphragm has concertina-like bellows. Depending on the length of the bellows, the distance between open and closed positions can be chosen accordingly. The bellows is suited for especially long opening paths. The spring action of the bellows can be adjusted accordingly by selecting the number of folds. It goes without saying that a combination of the said circular ring is, for instance, also possible with the concertina-like bellows.

When the closure element in its closed position rests on an aperture edge of the pouring aperture and/or a sealing ring of the pouring aperture, the interior of the flask is closed by the closure element in an especially liquidproof and heat-insulated manner. The heat insulation serves, of course, liquids which must be kept either cold or warm. A sufficient liquid seal is already obtained when the closure element is just in contact with the aperture edge or the sealing ring. The combination of a contact with the aperture edge and the sealing ring is especially advantageous, since in cases where one contact fails the remaining contacting seal still provides for a sufficient liquidproof seal. This is, for instance, of advantage upon breakage of an insulating insert, which is normally pressed against the sealing ring. If, in this case, the sealing ring falls into the interior of the flask, the closure element will remain in contact with the aperture edge. In such a case the contact still establishes a liquidproof seal of the pouring aperture.

To dispense with the great number of seals in known flasks, it turns out to be especially advantageous when the diaphragm connects the closure element to the lid in a liquidproof manner. As a consequence, no liquid can enter between closure element, diaphragm and lid, so that the interior of the lid remains dry and the mechanism which is arranged therein for actuating the closure element is protected against outside action.

In a further embodiment, the diaphragm is connected to the closure element via a tubular section which extends approximately in a direction along the opening movement. The tubular section may serve as a fastening means or as an enclosure of the closure element. The tubular section is relatively dimensionally stable owing to the longitudinal extension of the tubular section, thereby guiding the closure element relative to the diaphragm or the lid. Furthermore, at least part of an elastic opening or closing force can be applied by deforming the tubular section.

The tubular section may advantageously be formed as part of the diaphragm. The corresponding functional division into the spring-elastic part and into the slightly more dimensionally stable part follows from the geometrical extension of the remaining part of the diaphragm and the tubular section, respectively.

When the diaphragm comprises a circular ring, the tubular section can be connected to the inner or outer circumference of this circular ring, and the circular ring is connected via the respectively remaining circumference to the lid.

It is here of advantage when the diaphragm comprises a substantially surrounding web which is supported in a groove in the lid. The diaphragm can easily be fastened in this manner to the lid, with the interior of the lid being sealed at the same time.

To be able to slightly lift the closure element from the pouring aperture also after a long time when the volume of the flask has slightly cooled down, and to be able to effect pressure compensation with the surroundings, the closure element may have provided therein a vent which connects the volume of the flask to the surroundings. This vent is normally relatively small in comparison with the pouring aperture. The diameter thereof is preferably 0.2 mm, and it is formed in the manner of a small breather inside the closure element.

In an advantageous embodiment, the closure element can be locked in place in the open position and can be unlocked by means of a release lever. Locking the closure element in the open position will facilitate the pouring operation, since the handle, which may, for instance, be designed as a first lever, need not permanently be held to counteract the restoring force of the diaphragm. After the pouring action, an unlocking operation can be performed by means of the release lever, and the closure element is automatically pressed again by the diaphragm onto the pouring aperture. The release lever may be provided as a second lever next to the first lever which serves as a handle.

An example of locking the closure element in place is given by a spring lever in the lid by which the handle is locked in the open position and which can be displaced by the release lever from the locked position for the handle. Here, the spring lever forms an automatic snap type mechanism which locks the closure element in the open position. The release lever may, for instance, be formed as a tilt lever which is displaced by pivoting the spring lever, thereby releasing the locked position with the handle and the closure element, respectively.

In a simple embodiment, the diaphragm just extends above the closure element, the latter having a sealing section which seals the pouring aperture through a corresponding contact with the edge of the pouring aperture and/or the sealing ring.

To improve the seal of the pouring aperture in the closed position of the closure element, the diaphragm may cover the bottom of the closure element at least opposite to the aperture edge and/or sealing ring. Moreover, in the case of a diaphragm which is formed as a solid rubber, the bottom may be fully gummed with the diaphragm, i.e. it may be covered by the diaphragm.

To be better adapted to a curvature of the aperture edge and of the sealing ring, respectively, and in order to be shaped so as to be contactable with the curvature in an improved manner, it has turned out to be advantageous when the bottom and/or the diaphragm which covers the bottom is/are convexly curved.

Different handles for adjusting a closure element which is loaded in the closed position are known per se and can be used in the flask according to the invention. These are, for instance, knobs for vertically adjusting the closure element and lever mechanisms which tilt the closure element relative to the pouring aperture or lift the closure element upwardly along an opening path extending from the pouring aperture outwardly in curved fashion. In a simple embodiment for a handle, the latter is formed as a two-armed lever which is supported in the lid and whose tilt bearing is eccentrically arranged relative to the longitudinal axis of the flask.

A corresponding actuating end of the lever projects from the lid to the outside. The other end of the lid is in motional communication with the closure element.

The lid may comprise a cap and a lid body which supports the cap and comprises a threaded section at the lower end, with the groove being possibly arranged on the inside of the threaded section for supporting the diaphragm web. The two parts can easily be produced separately and can be interconnected for assembling the lid.

The tilt bearing of the lever may be arranged on the cap or the lid body. In a simple embodiment the lid body is provided above the threaded section with a lid shoulder on which the tilt bearing is arranged.

To lift the closure element substantially in a vertical direction, the tilt bearing is advantageously formed as a horizontally extending bearing axis.

The lever may be formed as a flat component or in a planar manner. In a preferred embodiment, the lever is substantially L-shaped, with a longer L-leg comprising a flat actuation section at its free end, and with side walls interconnecting both L-legs at least outside the actuation section and being formed at their lower ends with snap type recesses to be snapped onto the bearing axis. The lever thus forms an at least partly closed body which can project from the lid laterally and/or upwardly.

To simply connect lever and closure element, bearing eyes project at exterior sides of the side walls for pivotably supporting a closure carrier connected to the closure element. By analogy, an axis at which the closure carrier is pivotably supported may be arranged between the side walls.

In the simplest case the closure carrier comprises two bearing arms which project from the closure element upwards towards the cap and which, next to their upper ends, comprise bearing openings for receiving the bearing eyes. The closure carrier may be produced separately with respect to the closure element and may be connected to the closure element. Closure carrier and the connection thereof with the closure element can be covered by the diaphragm to the outside in a liquidproof manner.

For an easier connection of the bearing arms with the bearing eyes, inclined insertion portions which extend in the direction of the bearing openings are formed at the upper ends and on the opposite inner sides of the bearing arms. These inclined portions rise in the manner of ramps towards the bearing openings.

A one-part construction of closure element and closure carrier is preferred. A simple one-part construction is characterized in that the bearing arms extend in an extension of a tubular attachment which is arranged on the upper side of the closure element. The tubular attachment may simultaneously serve contact purposes and to retain the diaphragm on the closure element. The diaphragm may be held in a frictionally engaged manner or in a positive manner.

If, in the closed position of the closure element, the closure element or the diaphragm also or solely rests on the sealing ring, it may happen that partly because of manufacturing tolerances in the insulating insert the sealing ring is slightly pressed in the direction of the lid upwards or towards the pouring aperture inwardly. In such a case a relatively high contact pressure is needed in the closed position of the closure element to bring the closure element into tight contact with the sealing ring along the entire aperture edge of the pouring aperture despite a displacement of the sealing ring, or otherwise closure element and sealing ring are not in an entire sealing contact with one another. In this connection it has been found to be of advantage when the sealing ring comprises a sealing body which rests on the insulating insert and from which a sealing lip projects substantially radially towards the pouring aperture. In the closed position of the closure element, the sealing lip is in contact with the closure element and/or the diaphragm. Since it is not the entire sealing body, but only the sealing lip which must be deformed in the case of the above-described displacement of the sealing ring, the contact pressure which is needed for sealing is reduced. Such a pressure will at any rate be provided by the spring-elastic diaphragm. Sealing lip and sealing body are normally formed as one part.

In principle, the sealing lip may project at any desired place from the sealing body. Preference is here given to an embodiment in which an upper side of the sealing lip is arranged in surface alignment with the upper side of the sealing body and a bottom side of the sealing lip extends substantially in a direction perpendicular to the inner wall of the sealing body. To ensure deformation of the sealing lip with simultaneous sealing by applying the closure element, the sealing lip may be given a decreasing thickness towards the sealing body. This is, for instance, accomplished in that the bottom side of the sealing lip extends in inclined fashion upwards at an angle of less than/equal to 20°, preferably between 8° to 12°, towards the inner wall of the sealing body.

BRIEF DESCRIPTION OF THE DRAWINGS

Advantageous embodiments of the invention will be explained and described in detail in the following text with reference to the figures which are attached to the drawing, in which.

DETAILED DESCRIPTION OF THE INVENTION

Figure 1:
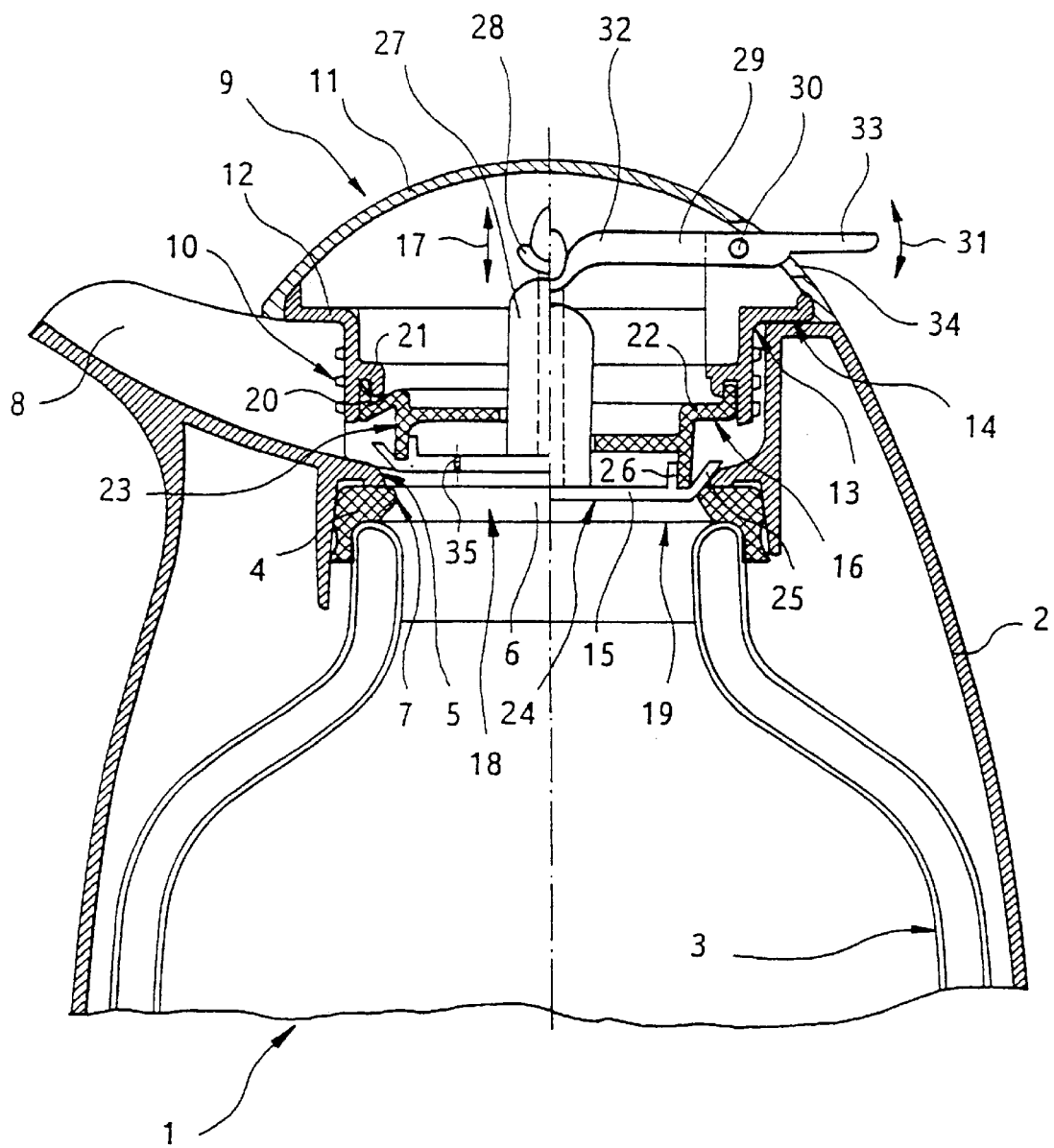
FIG. 1 is a vertical section through an upper portion of a flask according to the invention.

FIG. 1 illustrates a flask 1 as an insulating flask. The flask comprises an outer flask jacket 2, which is preferably made from plastics, and an insulating insert 3 positioned therein, as is sufficiently known from the prior art for receiving and insulating liquids. The insulating insert 3 is pressed via a sealing ring 4 of rubber against an aperture edge 5 of the flask jacket. Aperture edge 5 and sealing ring 4, respectively, form a pouring aperture 6.

The sealing ring 4 has an approximately L-shaped form and defines the pouring aperture 6 with a sealing lip 7. At the left side of flask 1, a spout 8 is formed which adjoins the pouring aperture 6.

In FIG. 1, a lid 9 which is detachably securable to the flask jacket 2 via a threaded section 10 is arranged above the pouring aperture 6. At its upper side, the lid 9 has a spherical or calotte-shaped cap 11 which is mounted on a lid body 12 carrying the threaded section 10. The lid body 12 has a lid shoulder 13 which in the screwed-in state of lid 9 is in contact with a face 14 of the flask jacket 2, so that the lid body is spaced apart from the aperture edge 5.

A closure element 15 which is connected to the lid body 12 via a spring-elastic diaphragm 16 is arranged on the bottom side of the lid body 12. The closure element 15 is movable in a direction along the substantially vertical opening movement, as is illustrated by arrow 17. In the left half of the drawing, the closure element 15 is shown in the open position 18 and in the right half of the drawing in the closed position 19.

The diaphragm 16 is accordingly shown in the left half in a deformed state and in the right half in a relatively undeformed state. The diaphragm 16 is supported through a web 20 in an annular groove 21 of the lid body 12. This arrangement is followed by a planar circular ring 22 which in the closed position 19 is disposed in an approximately horizontal direction and which contributes to the deformation action proper of the diaphragm. Directly next to the circular ring 22, there is integrally molded thereon a tubular section 23 which extends in the direction of the opening movement. The closure element 15 is mounted on the tubular section 23. The diaphragm 16 consists of spring-elastic rubber.

The closure element 15 has an approximately circular bottom 24 and a sealing section 25 adjoining the bottom on the outside. The sealing section 25 tapers from the open position 18 to the closed position 19. In the closed position 19, the sealing section 25 rests on the aperture edge 5 and the sealing lip 7. In the open position 18, it is lifted from the two members, so that the pouring aperture 6 communicates with the surroundings and liquid can flow from the insulating insert 3 via the spout 8. In the closed position, the sealing section 20 rests in heat- and liquidproof manner on the sealing lip 7 and in liquidproof manner on the aperture edge 5. In the bottom 24, a vent 35 is arranged as a hole having a diameter of about 0.2 mm, which in the closed state of closure element 15 connects the interior of the insulating insert 3 via the interior of lid 9 to the surroundings.

The tubular section 23 is attached from the outside onto a tubular attachment 26 of bottom 24.

The bottom 24 is centrally followed towards the upper side of the lid 9 by a closure carrier 27 which at its upper side is engaged by a hook 28 of a lever 29. Lever 29 serves as a handle and is tiltable via a tilt bearing 30 in the pivoting direction marked by arrow 31. A first end 32 of lever 29 acts on closure carrier 27 while a second end 32 of lever 29 extends through a passage opening 34 of cap 11 towards the outside of lid 9. On account of the eccentric arrangement of the tilt bearing 30 relative to the longitudinal axis of the flask and the motional connection of lever 29 and closure carrier 27, the opening movement of the closure element is not strictly vertical, but curved towards the tilt bearing.

Figure 2:
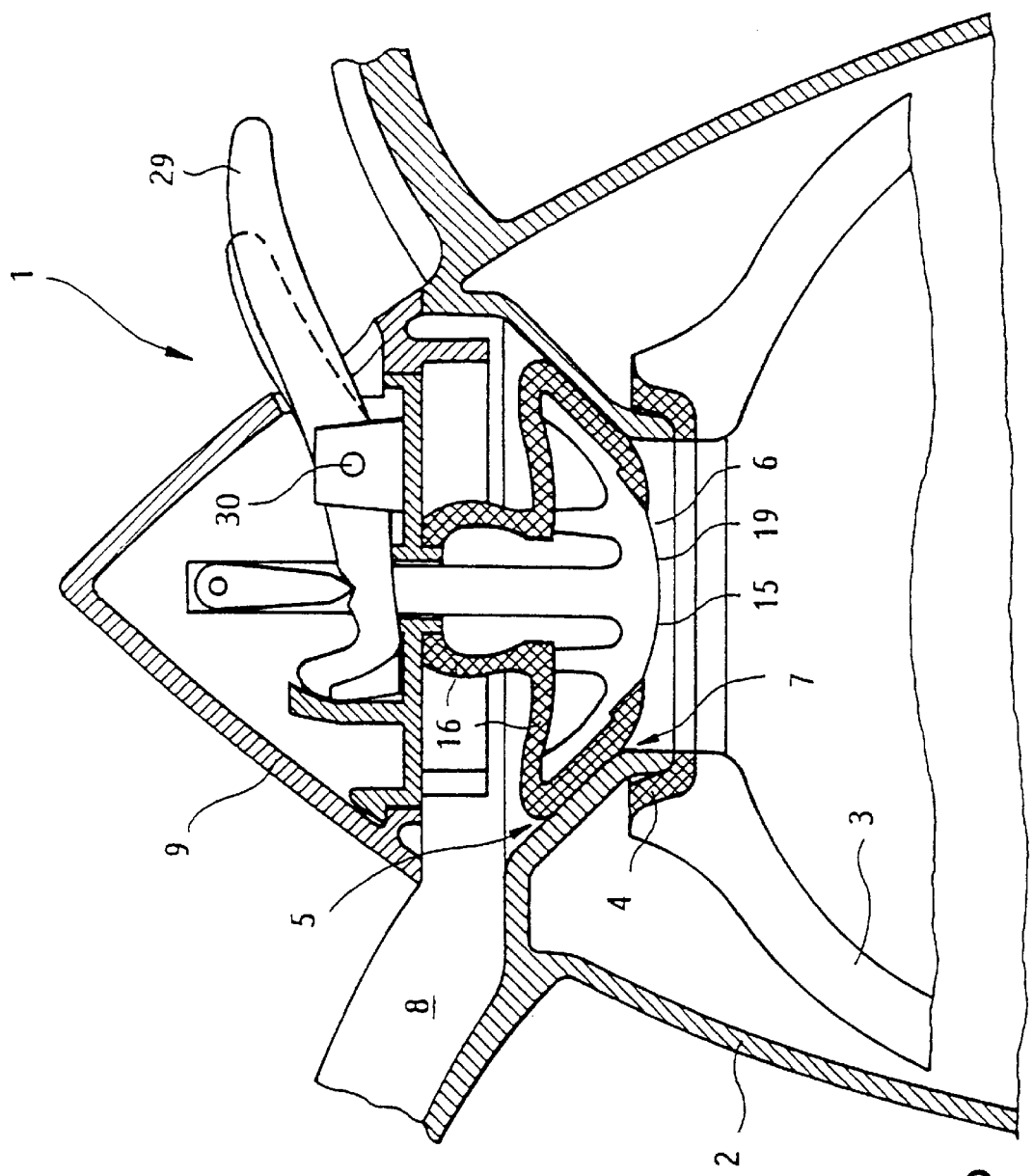
FIG. 2 is a vertical section according to FIG. 1 through a further embodiment of the flask of the invention with the closure element being in the closed position.
Figure 3:
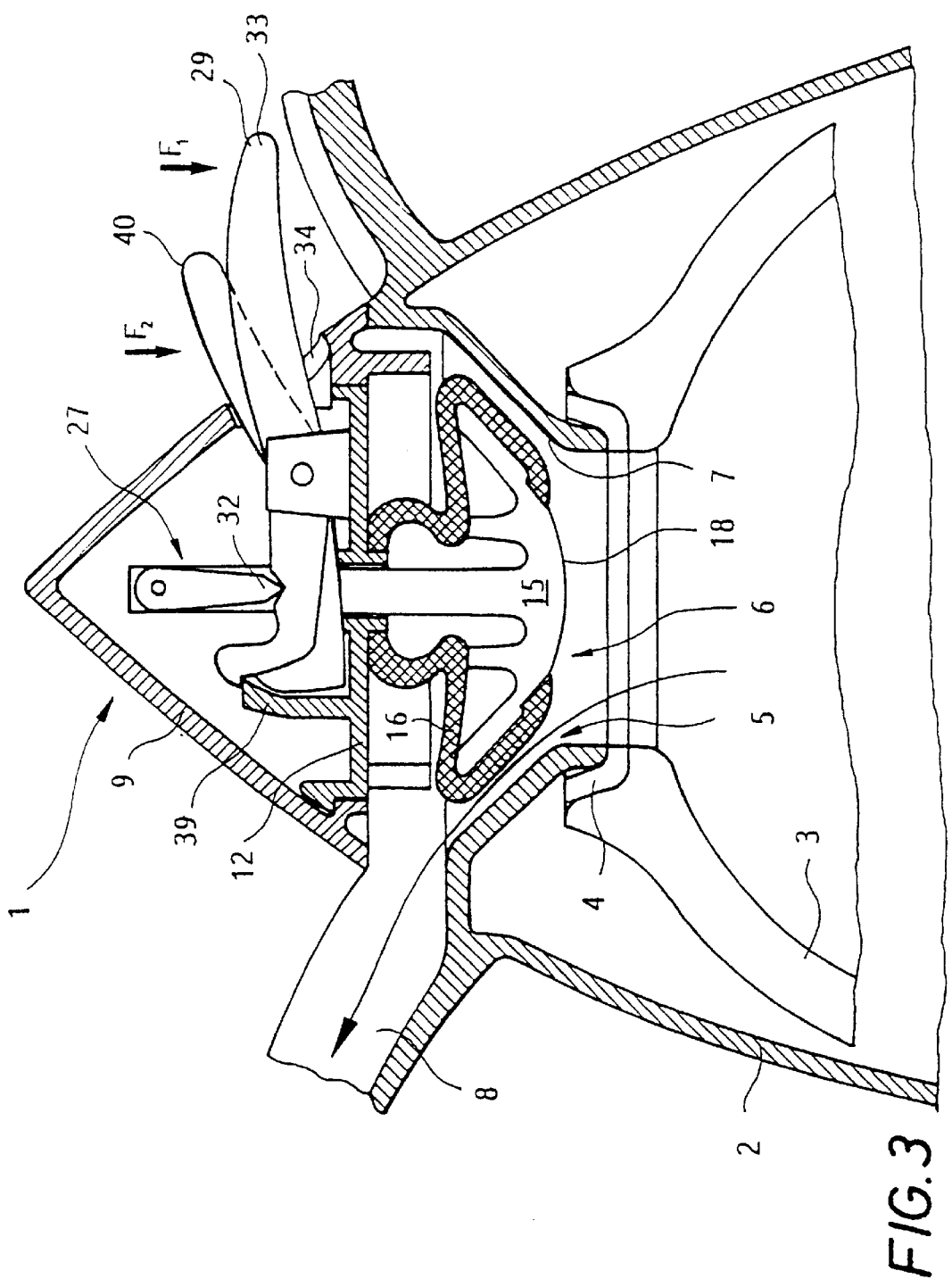
FIG. 3 is a vertical section according to FIG. 2 with the closure element being in the locked and open position.
Figure 4:
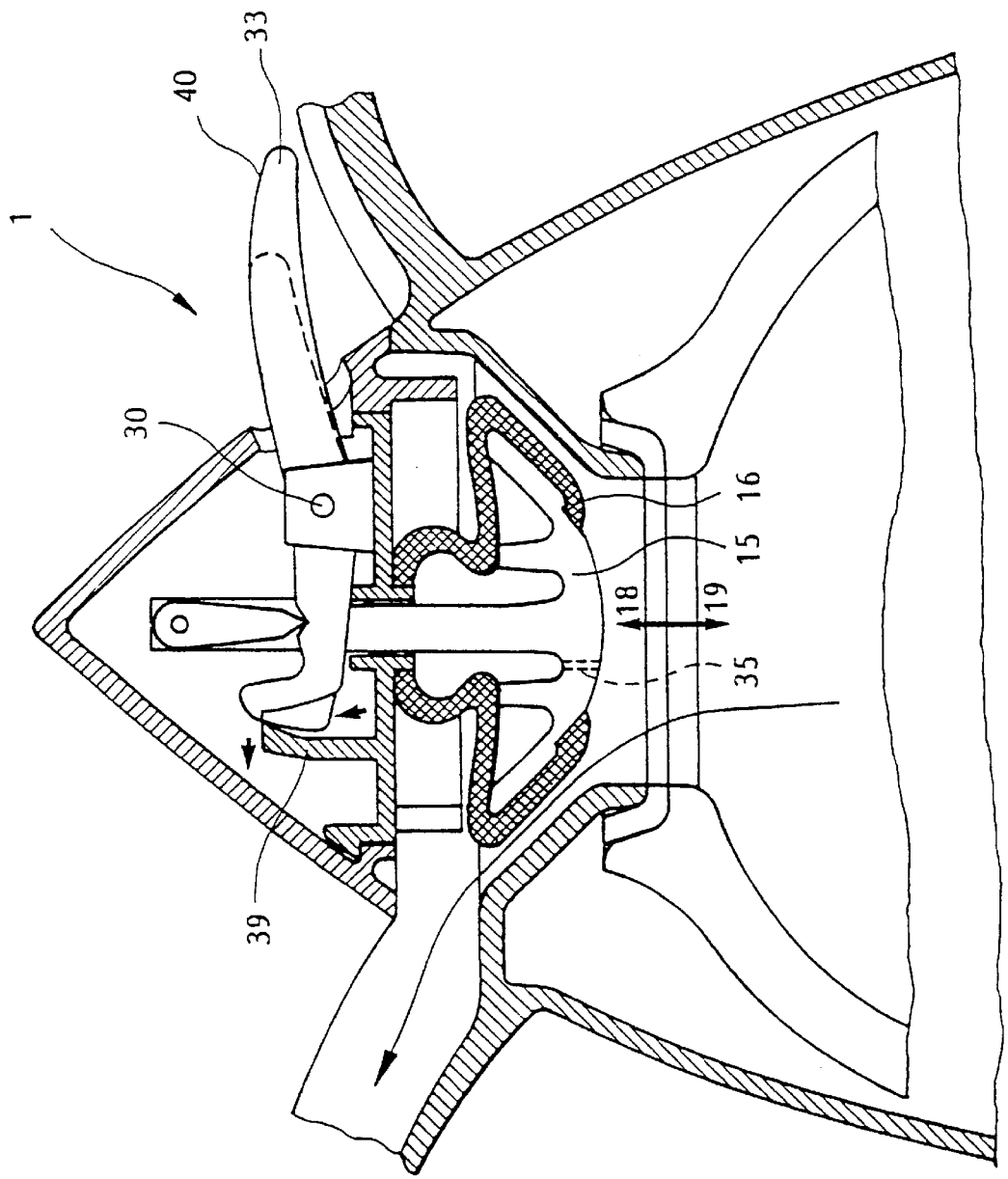
FIG. 4 is a vertical section according to FIGS. 2 and 3, with the closure element being in the open position and the release lever in its actuated state.

FIGS. 2 to 4 illustrate a second embodiment of the flask according to the invention, with reference being made to the above description as far as identical reference numerals are concerned.

As already mentioned above, the diaphragm in FIGS. 2 to 4 is formed as bellows which in the closed position 19 shown in FIG. 2 is relatively relaxed and is vertically compressed in the open positions 18 according to FIGS. 3 and 4, whereby the restoring force of the diaphragm 16 is also produced. Diaphragm 16 covers bottom 24 at least in the area of sealing section 25. Bottom and diaphragm are convexly curved towards the pouring aperture 6.

In addition to lever 29, there are provided a spring lever 39 and a release lever 40 on lid 9 in FIGS. 2 and 4. Release lever 40 is also pivotable about the tilt bearing 30. The spring lever 39 is integrally formed with the lid body 12. It projects vertically upwards approximately in the direction of the opening movement 17. In the closed position, lever 29 laterally rests on spring lever 39, as shown in FIG. 2. The release lever 40 is arranged approximately in parallel with the spring lever 39 and rests also slightly on the spring lever 39. The spring lever can flexibly be displaced in a direction perpendicular to its direction of extension.

FIG. 3 illustrates a locked open position 18 in which lever 29 is pressed downwardly at the second end 33, so that the first end 32 lifts the closure element 15 upwardly. In so doing, the first end 32 grips with a shoulder beyond the face end of the spring lever 39. When the first end 32 is lifted, spring lever 39 will first be pressed to the side and will then snap back automatically below the shoulder of lever 29. When lever 29 is pressed downwards with an opening force $F_1$ at its first end 32, the closure element 15 will automatically be locked thereby in the open position 18 via spring lever 39. The release lever 40 first remains in the initial position according to FIG. 2.

To release the locking according to FIG. 4, the release lever 40 is pressed down at its external end, so that it slightly displaces the spring lever 39 to the left side with its respectively other end and releases it from its locked position with lever 29. Force $F_2$ which is here exerted on release lever 40 is relatively smaller than the greater force $F_1$. When the two levers are now arranged in parallel with one another again, the closure element 15 can again be transferred into the closed position 19 in which lever 29 is released and automatically pressed upwards with its first end 32 by th restoring force of diaphragm 16.

With the aid of the locking principle illustrated in FIGS. 2 to 4, the closure element 15 can easily be fixed in the open position 18, so that liquid can be poured out without the need for keeping the lever 29 constantly depressed as the handle.

It goes without saying that the diaphragm 16, for instance, can also be formed as an extremely elastic and deformable solid rubber, with the diaphragm entirely covering the bottom 24 of the closure element 15.

Figure 5:
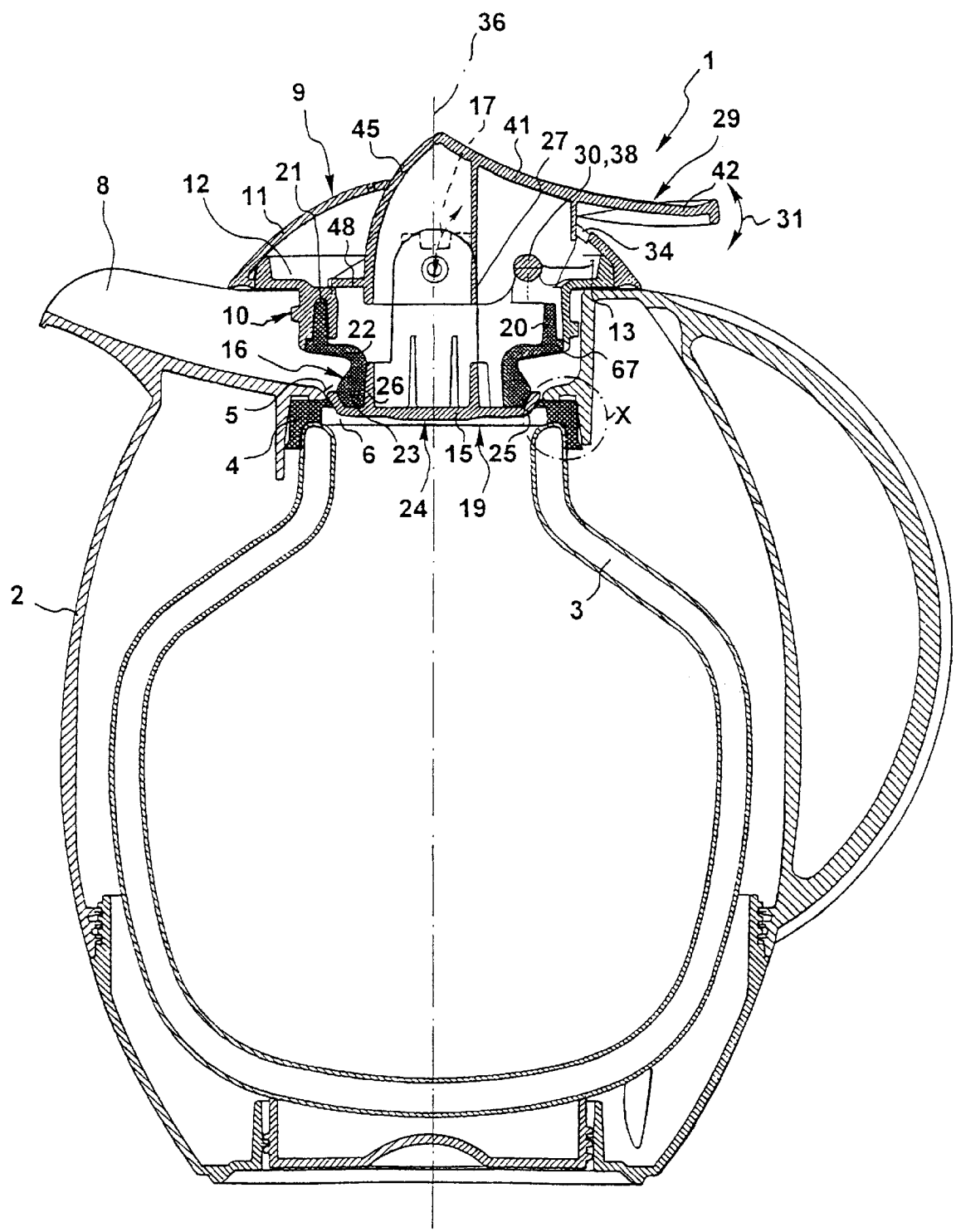
FIG. 5 is a vertical section through a third embodiment of a flask according to the invention.

FIG. 5 shows a third embodiment of a flask 1 according to the invention. Like parts are again provided with like reference numerals and are only mentioned in part. The third embodiment of the flask differs from the formerly illustrated embodiments, in particular, by a different lever mechanism, by a different connection between lever and closure element and in the form of the diaphragm 16.

Like in the first embodiment, the diaphragm is frictionally held by means of its tubular section 23 on the closure element 15 between sealing section 25 and tubular attachment 26. At the upper end of the tubular attachment 26 the diaphragm has a circular ring 22 which radially projects outwardly from the tubular section. A diaphragm web 20 substantially projects on the outer circumference of the circular ring 22 upwards in parallel with the longitudinal axis 36 of the flask and is inserted into the annular groove 21 in the lid body 12. Furthermore, the diaphragm 16 is provided at the lower end of web 20 with a shoulder 67 which is in contact with a corresponding mating shoulder on the threaded portion 10 of lid body 12.

In FIG. 5, the closure element 15 is shown in the closed position 19. The sealing section 25 rests on sealing ring 4. Depending on the design of the sealing ring, the sealing section may rest on the ring and on the aperture edge 5 or also only on the aperture edge 5.

For the purpose of opening the closure element 15, the element is provided at its upper side with the closure carrier 17 which is motionally connected to lever 29. Upon operation of the lever in pivot direction 31, the closure carrier 27 will substantially perform the curved opening movement 17. This movement corresponds to the arc of a circle with tilt bearing 30, or the bearing axis 38 forming the tilt bearing, as the center. The bearing axis 38 is eccentric relative to the longitudinal axis 36 of the flask, with the closure carrier 27 and closure element 15 being symmetrically arranged relative to the longitudinal axis 38 of the flask in the closed position 19.

The lever 29 according to FIG. 5 is substantially L-shaped having a longer L-leg 41 and a shorter L-leg 45. A flat actuation portion 42 is arranged at the free end of the longer L-leg 41. The longer L leg 41 and, in part, the shorter L-leg 45 project from the passage opening 34 in cap 11 to the outside. The passage opening 34 extends next to the edge of cap 11 beyond the longitudinal axis 36 of the flask.

The longer L-leg 41 is concavely curved and the shorter L-leg 45 is convexly curved to the outside. The curvature of the shorter L-leg 45 corresponds to the curvature of the arc of a circle with the bearing axis 38 as the center.

A stop flange 48 vertically projects at the outer side of the shorter L-leg 45. This flange can optionally limit the pivotal movement of the handle 29 in contact direction by contacting the lid shoulder 13 from above. However, the pouring aperture 6 is entirely sealed at any rate by closure element 15 and/or diaphragm 16 already before the stop flange 48 comes to rest on the lid shoulder 13.

Figure 6:
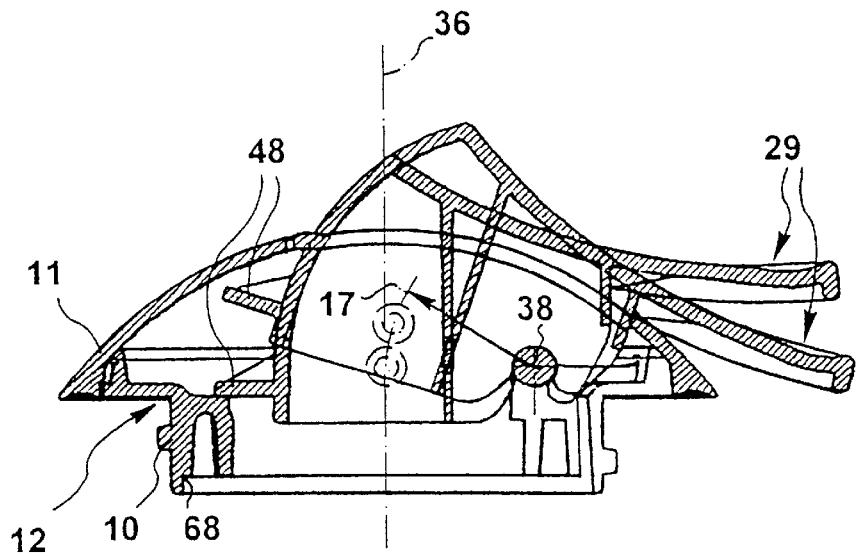
FIG. 6 shows part of a lid according to FIG. 5.

FIG. 6 shows a detail of cap 11 with lid body 12 and lever 29. The lever 29 is shown in two different positions according to the closed position and the open position of the closure element; see FIG. 5. A suspension point which is formed by bearing eyes for the closure carrier moves along the direction of the opening movement 17 which ends tangentially in the longitudinal axis 36 of the flask towards the closed position. Depending on the connection between lever and closure element, the closure element performs an analogous arcuate opening movement (see FIG. 1 and FIG. 5) or performs a vertical opening movement (see FIGS. 2–4).

FIG. 6 does not show the diaphragm, so that the mating shoulder 68 for shoulder 67 (see FIG. 5) is well visible on the threaded section 10 of the lid body 12.

Figure 7:
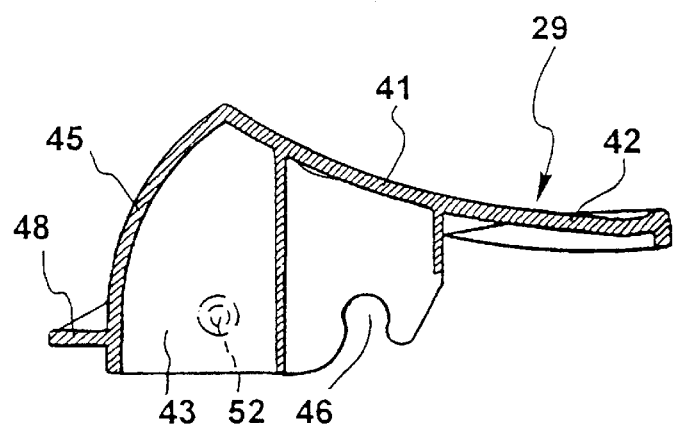
FIG. 7 shows a lever according to FIG. 6.
Figure 8:
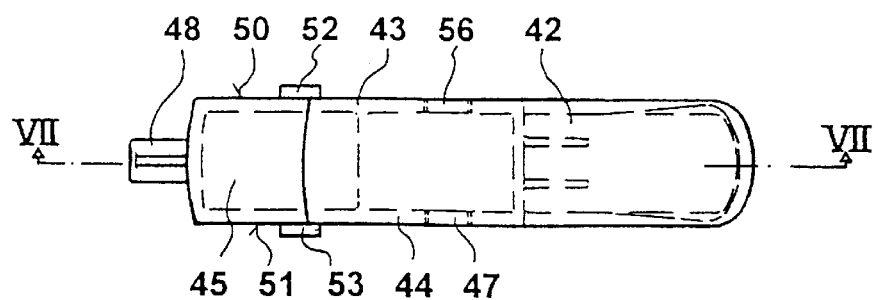
FIG. 8 is a top view on the lever according to FIG. 7.

FIGS. 7 and 8 show a section through lever 29 and a top view on the lever, with FIG. 7 corresponding to a section taken along line VII—VII of FIG. 8.

The two L-legs 41 and 45 of lever 29 are interconnected by side walls 43 and 44 outside the actuation section 42. In each side wall, a downwardly open snap-type recess 46 and 47, respectively, is formed on the bottom side of the side wall. This recess serves to snap lever 29 onto bearing axis 38; see FIG. 6.

A body which is only open in downward direction and which according to FIG. 5 projects at least partly from the passage opening 34 of lid 9 is formed by the side walls 43, 44 and the L-legs 41, 45.

Bearing eyes 52, 53 on which the closure carrier 27 according to FIG. 5 is pivotably supported are arranged on the exterior sides 50, 51 of side walls 43, 44.

To stiffen lever 29, further transverse or connection walls are arranged between the side walls 43 and 44 or between stop flange 48 and L-leg 45.

Figure 9:
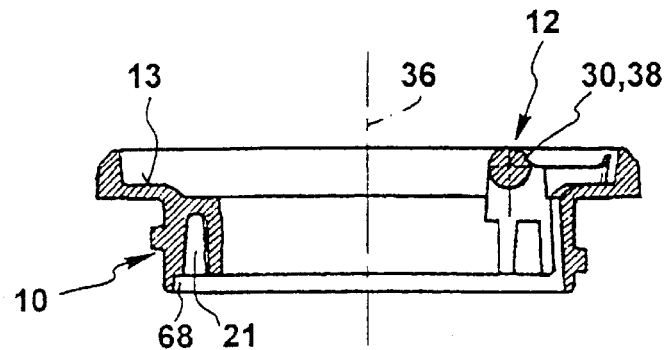
FIGS. 9 and 10 show two views of a bottom portion of the lid according to FIG. 6.
Figure 10:
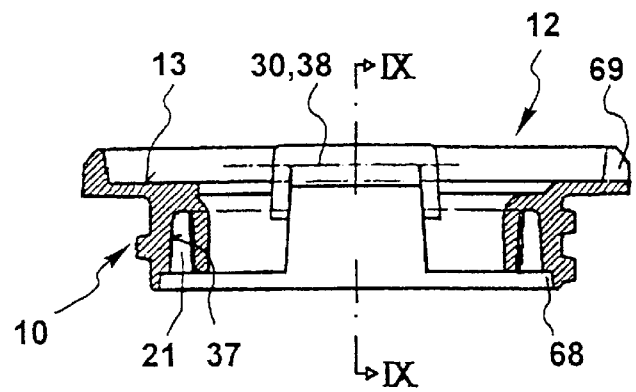

FIGS. 9 and 10 show two sections through the lid body 12, with FIG. 9 corresponding to a section taken along line IX—IX of FIG. 10. As can be seen, the tilt bearing 30 or bearing axis 38, respectively, is eccentrically arranged relative to the longitudinal axis 36 of the flask. In the area of the bearing axis 38 which extends substantially in horizontal direction, the annular groove 31 is interrupted. The annular groove 21 is here arranged on the inside of the threaded section 10, the latter being formed at its lower end with the mating shoulder 68. The lid shoulder 13 may have a step which projects radially beyond the threaded section 10 to the outside and is higher than the step arranged above the annular groove 21.

For the connection of cap and lid body 12, corresponding locking means and mating locking means may be formed on the two members. For mutual orientation the lid body 2 may be provided on its circumference, for instance, with an orientation opening 69 which is engaged by a corresponding projection on the lid cap 11.

Figure 11:
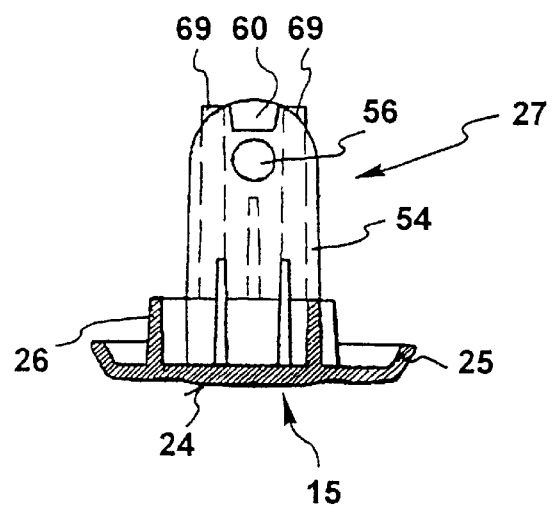
FIGS. 11 and 12 show two views of a closure element with a closure carrier according to FIG. 5.
Figure 12:
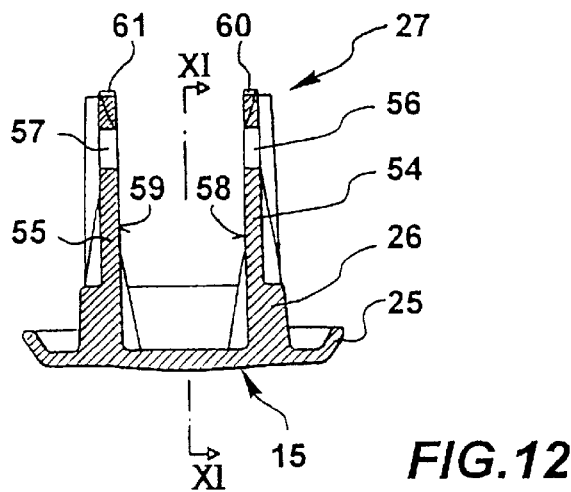

FIGS. 11 and 12 show two different sections through the closure carrier 27 with closure element 15, with FIG. 11 corresponding to a section taken along line XI—XI of FIG. 12.

The closure element 15 has a round circular bottom 24 from which a sealing section 25 projects on the circumference obliquely upwards. An upper side of the closure element 15 has arranged thereon the tubular attachment 26 which extends in the direction of the longitudinal axis of the flask. Bearing arms 54 and 55 which project from the tubular attachment upwards are integrally formed with the tubular attachment. The bearing arms are arranged opposite to one another and comprise bearing openings 56 and 57. These openings serve to receive the bearing eyes 52 and 53 (see FIG. 8).

Inclined insertion portions 60, 61 are formed on the insides 58, 59 of the bearing arms 54, 55 at the upper ends thereof and above the bearing openings 56 and 67. These inclined insertion portions rise in the manner of ramps towards the bearing openings.

To stiffen the bearing arms, corresponding struts extend between the arms and the upper side of the closure element 15 or the tubular attachment 26. Furthermore, stiffening columns 69 may be integrated into the bearing arms.

Figure 13:
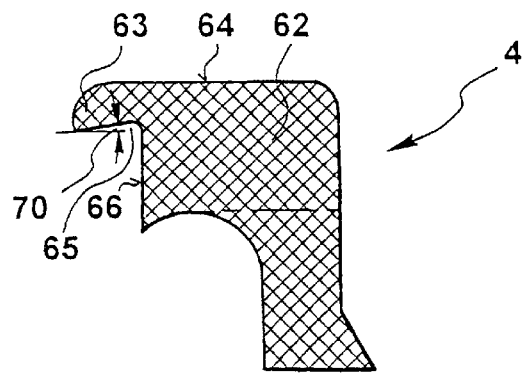
FIG. 13 is an enlarged illustration of a detail "X" of FIG. 5.

FIG. 13 shows a detail "X" of the sealing ring according to FIG. 5 on an enlarged scale. In contrast to the sealing ring 4 of FIG. 1, the sealing ring 4 according to FIG. 13 comprises a sealing lip 63 which projects in the form of a nose radially inwards from the remaining sealing body 62. The upper sides 64 of sealing lip 63 and sealing body 62 are arranged in surface alignment with one another. A bottom side 65 of the sealing lip 63 extends obliquely in the direction of an inner wall 66 of the sealing body 62 at an angle 70 upwardly. The angle 70 is smaller than or equal to 20°, preferably between 8° and 12°.

The remaining structure of the sealing ring 4 corresponds to the sealing ring of FIG. 1.

Figure 14:
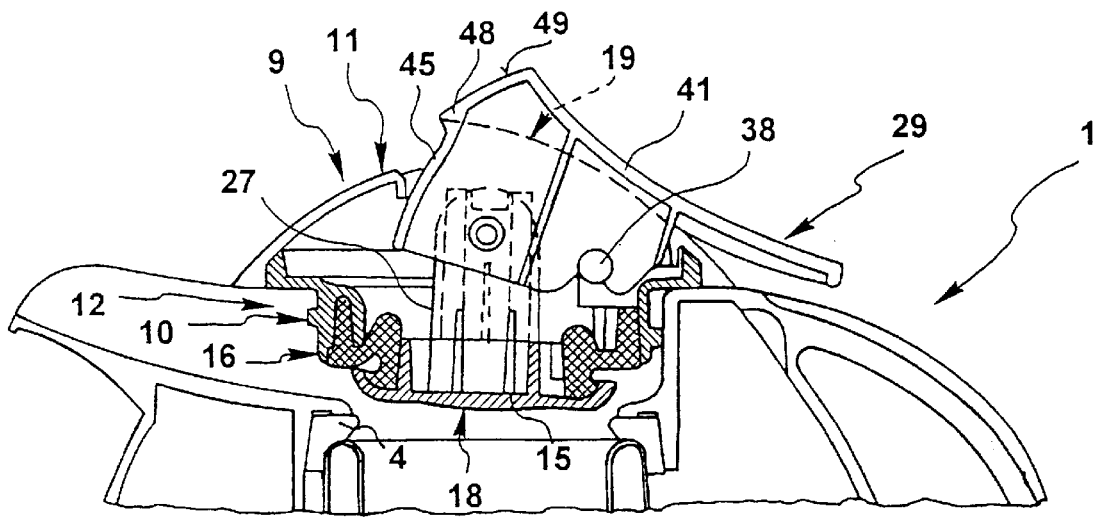
FIG. 14 is a vertical section through an upper portion of a fourth embodiment of the flask according to the invention.

FIG. 14 shows a fourth embodiment of a flask according to the invention. Like reference numerals mark like parts again and are only mentioned in part.

In contrast to the third embodiment, the lever 29 is differently designed. FIG. 14 shows the closure element 15 in the open position 18. The corresponding closed position 19 is shown in broken lines in the lever 29.

The remaining structure of diaphragm 16, closure element 15, closure carrier 27 and lever corresponds to that of the third embodiment of FIG. 5; see also FIGS. 6 to 12. Moreover, a sealing ring having a cross-section according to FIG. 13 can be used in the fourth embodiment.

The operation and function of the illustrated embodiments shall be described briefly hereinafter.

After lid 9 has been screwed onto flask 1, the closure element rests with its sealing section 25 on the sealing ring and/or the aperture edge, or rather the diaphragm gummed onto the bottom of the closure element rests on the sealing ring and/or the aperture edge. In this closed position the diaphragm 16 is slightly displaced and prestressed, so that the closure element 15 closes the pouring aperture 6 under a load. This load is sufficient for a heat- and liquidproof seal.

To be able to pour liquid out of the flask 1, the closure element is moved upwardly either entirely or at least in the area of the spout 8 by a one-hand operation against the load exerted by the diaphragm 16 in a direction along a vertical movement, along a movement curved outwardly from the longitudinal axis of the flask or by means of a tilting movement. As a result, the pouring aperture 6 is released at least in the area of the spout 8. Depending on the degree at which the closure element 15 is lifted, a corresponding restoring force is exerted by the diaphragm. The opening movement of the closure element can be effected by a lever mechanism or by other knobs, which are per se known, or by similar means.

As long as the closure element is held in the open position 18, liquid can be poured out.

The closure element is returned into the closed position 19, e.g. by releasing lever 29, whereby a tight connection is again established with the connection edge 5 and/or with sealing lip 7, 63. The diaphragm simultaneously connects the lid body 12 in liquidproof manner to the closure element 15 and/or the closure carrier 27. As a result, no liquid can pass into the interior of the lid, even in cases where liquid is poured out.

I claim:

1. A flask for liquids, in particular an insulating flask, in which a pouring aperture can be closed by means of a lid which can be releasably attached to said flask, and said lid is provided with a closure element which can be moved by means of a handle and which is loaded by a spring element towards a closed position and is movable in a substantially vertical opening movement between an open position, in which said pouring aperture is released, and the closed position, in which said pouring aperture is closed, wherein said spring element is formed from a spring-elastic diaphragm which connects said closure element to said lid, and said diaphragm comprises a substantially surrounding web which is supported in a groove of said lid.

2. The flask according to claim 1, wherein said diaphragm extends at least partly in a direction transverse to the opening movement of said closure element.

3. The flask according to claim 1, wherein said diaphragm is formed at least in part as a planar circular ring.

4. The flask according to claim 1, wherein said closure element in its closed position rests on at least one of an aperture edge of said pouring aperture and a sealing ring surrounding said pouring aperture.

5. The flask according to claim 4, wherein the sealing ring comprises a sealing lip which projects from a sealing body, resting on an insulating insert, substantially radially towards said pouring aperture.

6. The flask according to claim 5, wherein an upper side of said sealing lip is arranged in surface alignment with the upper side of said sealing body and a bottom side of said sealing lip extends in a direction approximately perpendicular to the inner wall of said sealing body.

7. The flask according to claim 5, wherein the bottom side of said sealing lip extends upwards in inclined fashion at an angle smaller than or equal to 20° towards the inner wall of said sealing body.

8. The flask according to claim 7, wherein said angle is between 8° and 12°.

9. The flask according to claim 1, wherein said diaphragm connects said closure element in liquidproof fashion to said lid.

10. The flask according to claim 1, wherein said diaphragm is connected to said closure element via a tubular section which extends approximately in a direction along the opening movement.

11. The flask according to claim 1, wherein said tubular section is integrally formed with said diaphragm.

12. The flask according to claim 1, wherein said tubular section is connected to the inner or outer circumference of the circular ring and said ring is connected via the respectively remaining circumference to said lid.

13. The flask according to claim 1, wherein a vent which connects the volume of the flask to the surroundings is provided in said closure element.

14. The flask according to claim 1, wherein said closure element is locked in the open position and can be unlocked through a release lever.

15. The flask according to claim 14, wherein said lid comprises a spring lever on which said handle is locked in the open position and which can be displaced by said release lever from the locked position with said handle.

16. The flask according to claim 1, wherein said closure element includes a sealing section which seals said pouring aperture in the closed position.

17. The flask according to claim 1, wherein said diaphragm covers a bottom of said closure element at least in a direction opposite to an aperture edge or a sealing ring.

18. The flask according to claim 1, wherein said bottom is fully gummed with said diaphragm.

19. The flask according to claim 1, wherein at least one of said bottom and said diaphragm are convexly curved.

20. The flask according to claim 1, wherein said handle is formed as a two-armed lever which is supported in said lid and a tilt bearing of which is eccentrically arranged relative to a vertical axis of said flask.

21. The flask according to claim 1, wherein said lid comprises a cap and a lid body which carries said lid and includes a threaded section at its lower end, with the groove for supporting the diaphragm web being arranged on an inside of said threaded section.

22. The flask according to claim 1, wherein above said threaded section said lid body has a lid shoulder which has disposed a said tilt bearing.

23. The flask according to claim 22, wherein said tilt bearing is designed as a horizontally extending bearing axis.

24. The flask according to claim 23, wherein said lever is substantially L-shaped, with a longer L-leg comprising a flat actuation section at its free end and side walls interconnecting the two L-legs at least outside an actuation section, with snap type recesses being formed at the lower end of said side walls to be snapped onto the bearing axis.

25. The flask according to claim 24, wherein bearing eyes project at exterior sides of said side walls for pivotably supporting a closure carrier connected to said closure element.

26. The flask according to claim 25, wherein said closure carrier comprises two bearing arms which project from said closure element upwards towards cap and which next to their upper ends comprise bearing openings for receiving said bearing eyes, and that inclined insertion portions which extend in the direction of said bearing openings are formed on the upper ends and at opposite inner sides of said bearing arms.

* * * * *